United States Patent
Smith et al.

(10) Patent No.: US 11,632,401 B2
(45) Date of Patent: Apr. 18, 2023

(54) SEMI-AUTOMATIC COMMUNICATION NETWORK MICROSEGMENTATION

(71) Applicant: Zscaler, Inc., San Jose, CA (US)

(72) Inventors: Peter Smith, Acton, MA (US); Aparna Ayikkara, Brookline, NH (US); Omar Baba, Winchester, MA (US); Daniel Einspanjer, Salem, NH (US); Anthony Gelsomini, Westwood, MA (US); Thomas C. Hickman, Hollis, NH (US); Peter Kahn, Southborough, MA (US); Thomas Evan Keiser, Jr., Boston, MA (US); Andriy Kochura, North Andover, MA (US); Nikitha Koppu, Shrewsbury, MA (US); Scott Laplante, Bedford, NH (US); Xing Li, Burlington, MA (US); Raymond Brian Liu, Lexington, MA (US); Sean Lutner, Norfolk, MA (US); Michael J. Melson, Arlington, MA (US); Peter Nahas, Watertown, MA (US); John O'Neil, Watertown, MA (US); Herman Parfenov, Andover, MA (US); Joseph Riopel, Worcester, MA (US); Suji Suresh, Westford, MA (US); Harry Sverdlove, North Reading, MA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 17/513,454

(22) Filed: Oct. 28, 2021

(65) Prior Publication Data
US 2022/0053026 A1 Feb. 17, 2022

Related U.S. Application Data

(63) Continuation of application No. 16/898,997, filed on Jun. 11, 2020, now Pat. No. 11,178,187.
(Continued)

(51) Int. Cl.
*H04W 12/08* (2021.01)
*H04L 41/0893* (2022.01)
(Continued)

(52) U.S. Cl.
CPC .......... *H04L 63/20* (2013.01); *H04L 41/0893* (2013.01); *H04L 63/0227* (2013.01); *H04L 67/10* (2013.01); *H04W 12/08* (2013.01)

(58) Field of Classification Search
CPC ......... H04L 63/10; H04L 63/20; H04L 67/10; H04L 63/0227; H04L 63/105; H04L 41/0893; H04W 12/08
See application file for complete search history.

(56) References Cited

U.S. PATENT DOCUMENTS

| 9,560,081 B1 | 1/2017 | Woolward |
| 10,154,067 B2 | 12/2018 | Smith et al. |

(Continued)

FOREIGN PATENT DOCUMENTS

WO 2018152303 A1 8/2018

*Primary Examiner* — Frantz B Jean
(74) *Attorney, Agent, or Firm* — Baratta Law PLLC; Lawrence A. Baratta, Jr.

(57) ABSTRACT

A technique for microsegmentation includes receiving information related to hosts and applications operating in a network where the information was obtained based on a survey of the network; identifying a plurality of microsegments utilizing the information, each microsegment includes a set of hosts similar to one another; for each of the plurality of microsegments, identifying security policies that control access to hosts in each microsegment; and providing the plurality of microsegments and corresponding security policies for approval thereof.

20 Claims, 2 Drawing Sheets

Related U.S. Application Data

(60) Provisional application No. 62/859,793, filed on Jun. 11, 2019.

(51) Int. Cl.
*H04L 9/40* (2022.01)
*H04L 67/10* (2022.01)

(56) References Cited

U.S. PATENT DOCUMENTS

| | | |
|---|---|---|
| 10,439,985 B2 | 10/2019 | O'Neil |
| 10,965,648 B2 | 3/2021 | Mishra et al. |
| 2017/0078168 A1* | 3/2017 | Harris, Jr. ............ H04L 63/0263 |
| 2017/0147157 A1* | 5/2017 | Shah ...................... H04L 63/104 |
| 2017/0230334 A1* | 8/2017 | Newell ................. H04W 12/37 |
| 2018/0176102 A1* | 6/2018 | Bansal .................. H04L 43/026 |
| 2019/0342173 A1 | 11/2019 | Navarro et al. |
| 2019/0349283 A1 | 11/2019 | O'Neil et al. |
| 2020/0021618 A1 | 1/2020 | Smith et al. |
| 2021/0306354 A1* | 9/2021 | Raghuramu .......... H04L 67/535 |
| 2021/0344723 A1* | 11/2021 | O'Neil .................. G06F 21/552 |
| 2022/0050921 A1* | 2/2022 | LaFever ............. H04L 63/0407 |

\* cited by examiner

SEMI-AUTOMATIC COMMUNICATION NETWORK MICROSEGMENTATION

CROSS-REFERENCE TO RELATED APPLICATIONS

This application is a continuation of U.S. patent application Ser. No. 16/898,997, filed Jun. 11, 2020, which is now U.S. Pat. No. 11,178,187, issued Nov. 16, 2021, which claims priority to U.S. Provisional Application No. 62/859,793, filed Jun. 11, 2019, the contents of each are incorporated by reference herein in their entirety.

This application is related to the following patent applications, both of which are incorporated by reference herein:

application Ser. No. 15/883,534, filed on Jan. 30, 2018, entitled, "Network Application Security Policy Enforcement," now U.S. Pat. No. 10,154,067, issued on Dec. 11, 2018 (hereinafter "the Policy Enforcement Patent"); and U.S. patent application Ser. No. 15/899,453, filed on Feb. 20, 2018 entitled, "Network Application Security Policy Generation," now U.S. Pat. No. 10,439,985, issued on Oct. 8, 2019 (hereinafter "the Policy Generation Patent").

BACKGROUND

The best-known approaches to network security require that each host and each application have the least possible access to other hosts and applications, consistent with performing their tasks. In practice, this typically requires creating large numbers of very fine-grained rules that divide a network into many separate subnetworks, each with its own authority and accessibility. This is referred to as "microsegmentation."

In practice, it is very difficult to perform microsegmentation well. Knowing in detail what functions a network is performing, and then crafting hundreds or thousands of precise rules for controlling access within the network, is a process that often takes years, and is prone to failure. Crafting such rules is difficult and expensive to perform manually precisely because it requires humans to perform several tasks that humans find it difficult to perform well, such as understanding big data and writing large sets of interacting rules.

What is needed, therefore, are improved techniques for performing microsegmentation.

SUMMARY

A computer system automatically generates a proposal for performing microsegmentation on a network. The system provides output representing the proposed microsegmentation to a user. The user provides input either approving or disapproving of the proposed microsegmentation. If the user approves of the proposed microsegmentation, then the system implements the microsegmentation. Otherwise, the system does not implement the proposed microsegmentation. This process may be repeated for a plurality of proposed microsegmentations within the same network, and may be repeated over time to modify one or more existing microsegmentations. The system advantageously performs the vast majority of the work required to microsegment the network automatically, leaving only the task of review and approval to the user. This both saves a significant amount of time and increases the quality of the microsegmentation in comparison to microsegmentation solely performed manually by one or more humans.

Other features and advantages of various aspects and embodiments of the present invention will become apparent from the following description and from the claims.

DETAILED DESCRIPTION

Figure 1:
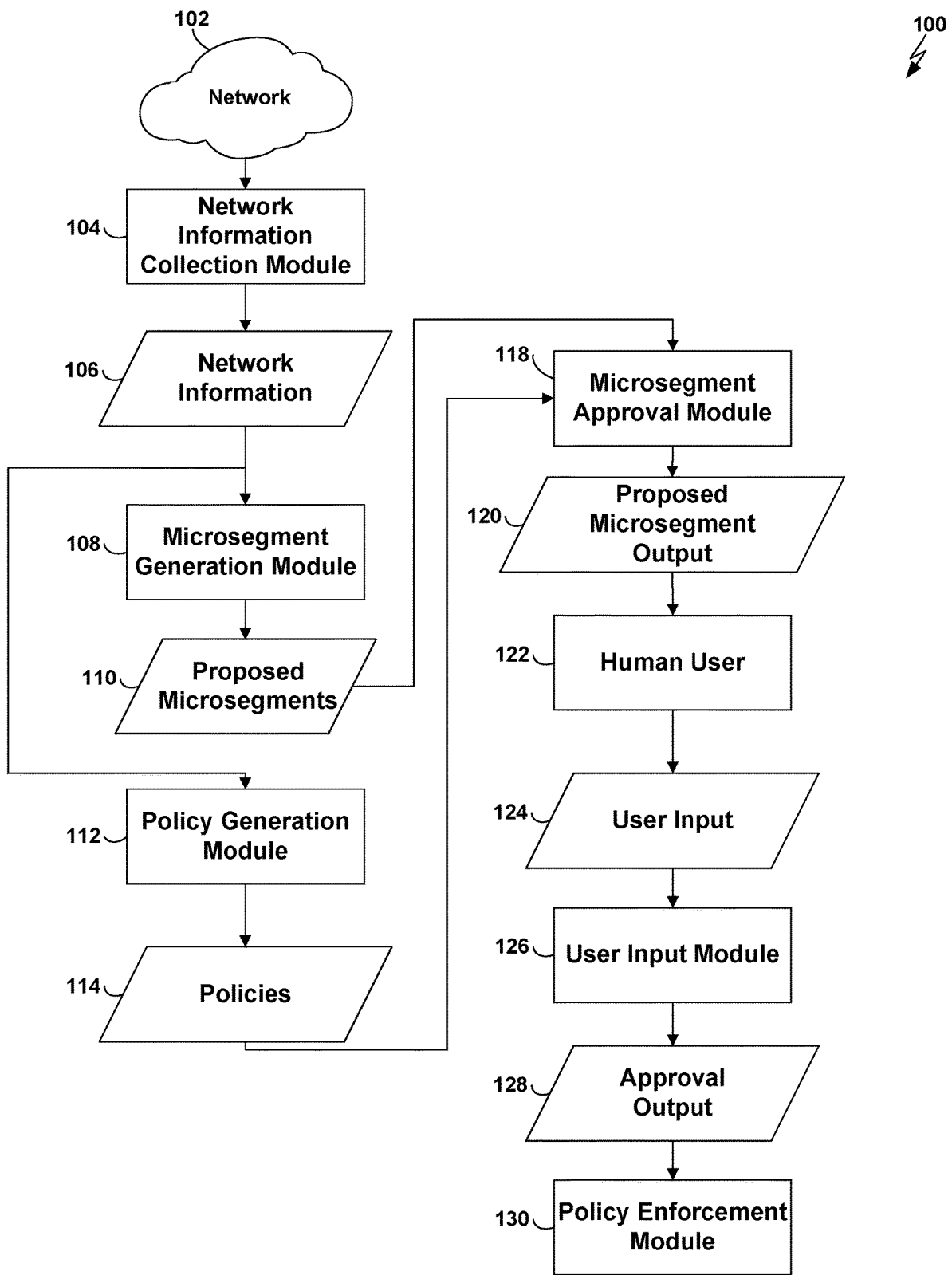
FIG. 1 is a dataflow diagram of a system for generating automatically proposing network microsegments and for receiving human approval of those proposed microsegments according to one embodiment of the present invention.

A computer system automatically generates a proposal for performing microsegmentation on a network. The system provides output representing the proposed microsegmentation to a user. The user provides input either approving or disapproving of the proposed microsegmentation. If the user approves of the proposed microsegmentation, then the system implements the microsegmentation. Otherwise, the system does not implement the proposed microsegmentation. This process may be repeated for a plurality of proposed microsegmentations within the same network, and may be repeated over time to modify one or more existing microsegmentations. The system advantageously performs the vast majority of the work required to microsegment the network automatically, leaving only the task of review and approval to the user. This both saves a significant amount of time and increases the quality of the microsegmentation in comparison to microsegmentation solely performed manually by one or more humans.

As described in the Policy Enforcement Patent and the Policy Generation Patent, information may be collected automatically about applications executing on a network, and network security policies may be generated automatically based on the collected information. Such policies may then be enforced at the application and host level within the network. As will be described in more detail below, embodiments of the present invention may group such policies together to define and secure a proposed microsegment (also referred to herein as a "microsegmentation"), which may then be put into effect without requiring human effort except for a review and approval of the proposed microsegment. Such approval may include as little as a single gesture (such as a single click or tap on a user interface element, such as an "OK" button), hitting a single key, or typing or speaking a single word or phrase.

In general, embodiments of the present invention may perform some or all of the following steps to perform microsegmenting of a network:

(a) Automatically surveying the network to find its functional components and their interrelations.

(b) Automatically creating one or more subgroups of hosts on the network, where each subgroup corresponds to a functional component. Each such subgroup is an example of a microsegment. A functional component may, for example, be or include a set of hosts that are similar to each other, as measured by one or more criteria. In other words, all of the hosts in a particular functional component may satisfy the same similarity criteria as each other. For example, if a set of hosts communicate with each other much more than expected, in comparison to how much they communicate with other hosts, then embodiments of the present invention may define that set of hosts as a functional component and as a microsegment. As another example, if hosts in a first set of hosts communicate with hosts in a second set of hosts, then embodiments of the present invention may define the first set of hosts as a functional component and as a microsegment, whether or not the first set of hosts communicates amongst themselves. As yet another example, embodiments of the present invention may define a set of hosts that have the same set of software installed on them (e.g., operating system and/or applications) as a functional component and as a microsegment. "Creating," "defining," "generating," "identifying" a microsegment may, for example, include determining that a plurality of hosts satisfy particular similarity criteria, and generating and storing data indicating that the identified plurality of hosts form a particular microsegment.

(c) For each microsegment identified above, automatically identifying existing network application security policies that control access to hosts in that microsegment. For example, embodiments of the present invention may identify existing policies that govern (e.g., allow and/or disallow) inbound connections (i.e., connections into the microsegment, for which hosts in the microsegment are destinations) and/or existing policies that govern (e.g., allow and/or disallow) for outbound connections (i.e., connections from the microsegment, for which hosts in the microsegment are sources). If the microsegmentation(s) were generated well, then the identified policies may govern connections between microsegments, in addition to individual hosts inside and outside each microsegment.

(d) Providing output to a human user representing each defined microsegment, such as by listing names and/or IP addresses of the hosts in each of the proposed microsegments. This output may be provided, for example, through a programmatic API to another computer program or by providing output directly through a user interface to a user.

(e) Receiving input from the user in response to the output representing the microsegment. If the user's input indicates approval of the microsegment, then embodiments of the present invention may, in response, automatically enforce the identified existing network application policies that control access to hosts in the now-approved microsegment. If the user's input does not indicate approval of the microsegment, then embodiments of the present invention may, in response, automatically not enforce the identified existing network application policies that control access to hosts in the now-approved microsegment.

In prior art approaches, most or all steps in the microsegmenting process are performed manually and can be extremely tedious, time-consuming, and error prone for humans to perform. Embodiments of the present invention improve upon the prior art by performing a variety of functions above automatically and thereby eliminating the need for human users to perform those functions manually, such as:

automatically defining the sets of source and destination network host-application pairs that are involved in the policies to be applied to the microsegment;

automatically establishing the desired behavior in the microsegment, including but not limited to answering the questions: (a) are the policies that apply to the microsegment intended to allow or to block communications between the two host-application sets; and (b) are the policies that apply to the microsegment intended to allow or block communications within the host-application sets?; and automatically configuring and applying rules for each of the desired behaviors above so that they can be executed by the agents on the hosts.

More specifically, embodiments of the present invention automatically identify proposed microsegments, and then:

Receive input from the user indicating whether the user approves of each proposed microsegment. Such input may, for example, be binary for each microsegment, such as an input indicating "approve" or "disapprove." The input may consist of a single gesture, such as a single click or tap (e.g., on an "approve" or "OK" button). The user may provide separate input for each of one or more of the proposed microsegments, or may provide a single input that applies to some or all of the proposed microsegments. For example, the user may provide a single "approve" input that applies to all of the proposed microsegments.

In response to receiving input from the user approving of one or more proposed microsegments, enforcing the policies that define and protect the approved microsegment(s).

Because embodiments of the present invention perform the functions above automatically (i.e., without human intervention), the human user need only review the proposed microsegment(s) and approve or disapprove of them. When such functions are otherwise attempted to be performed manually, they can involve months or even years of human effort, and often they are never completed. One reason for this is the task's inherent complexity. Another reason is that no network is static; new hosts and new functional requirements continue to arise over time. If microsegmentation policies are not updated over time, those new requirements cannot be satisfied, and the existing microsegmentations become obsolete and potentially dangerously insecure.

To address changing hosts, network topologies, and network application security policies over time, embodiments of the present invention may repeat any of the methods disclosed herein over time. For example, embodiments of the present invention may repeat the methods disclosed herein to perform any one or more of the following functions multiple times over time:

identifying (or updating existing) microsegments;

identifying updated network application security policies and applying those updated policies to existing or updated microsegments;

prompting the user for approval of new and/or updated microsegments; and applying the identified network application security policies only if the user approves of the new and/or updated microsegments.

As just one example, embodiments of the present invention may, at a first time, perform methods disclosed herein to create and receive the user's approval of a particular microsegment and, in response to that approval, apply identified network application security policies to that particular microsegment. Embodiments of the present invention may then, at a second time that is later than the first time, perform methods disclosed herein to identify an updated version of a previously-approved microsegment (such as a version in which one or more hosts have been added to the microsegment). Embodiments of the present invention may prompt the user for approval of the updated microsegment. If the user's input indicates approval of the updated microsegment, then embodiments of the present invention may apply the identified network application security policies to the updated microsegment. If, however, the user's input indicates disapproval of the updated microsegment, then embodiments of the present invention may not apply the identified network application security policies to the updated microsegment. This is an example in which embodiments of the present invention may (in response to user approval) apply network application security policies to an earlier version of a microsegment but not (in response to user disapproval) apply those (or different network application security policies to a later version of the microsegment.

Embodiments of the present invention may make use of the technology disclosed in the above referenced Policy Enforcement Patent and Policy Generation Patent. Those documents disclose how to perform functions such as collecting application and host data, creating microsegments (also referred to therein as "collections") and policies, and enforcing those policies.

Figure 2:
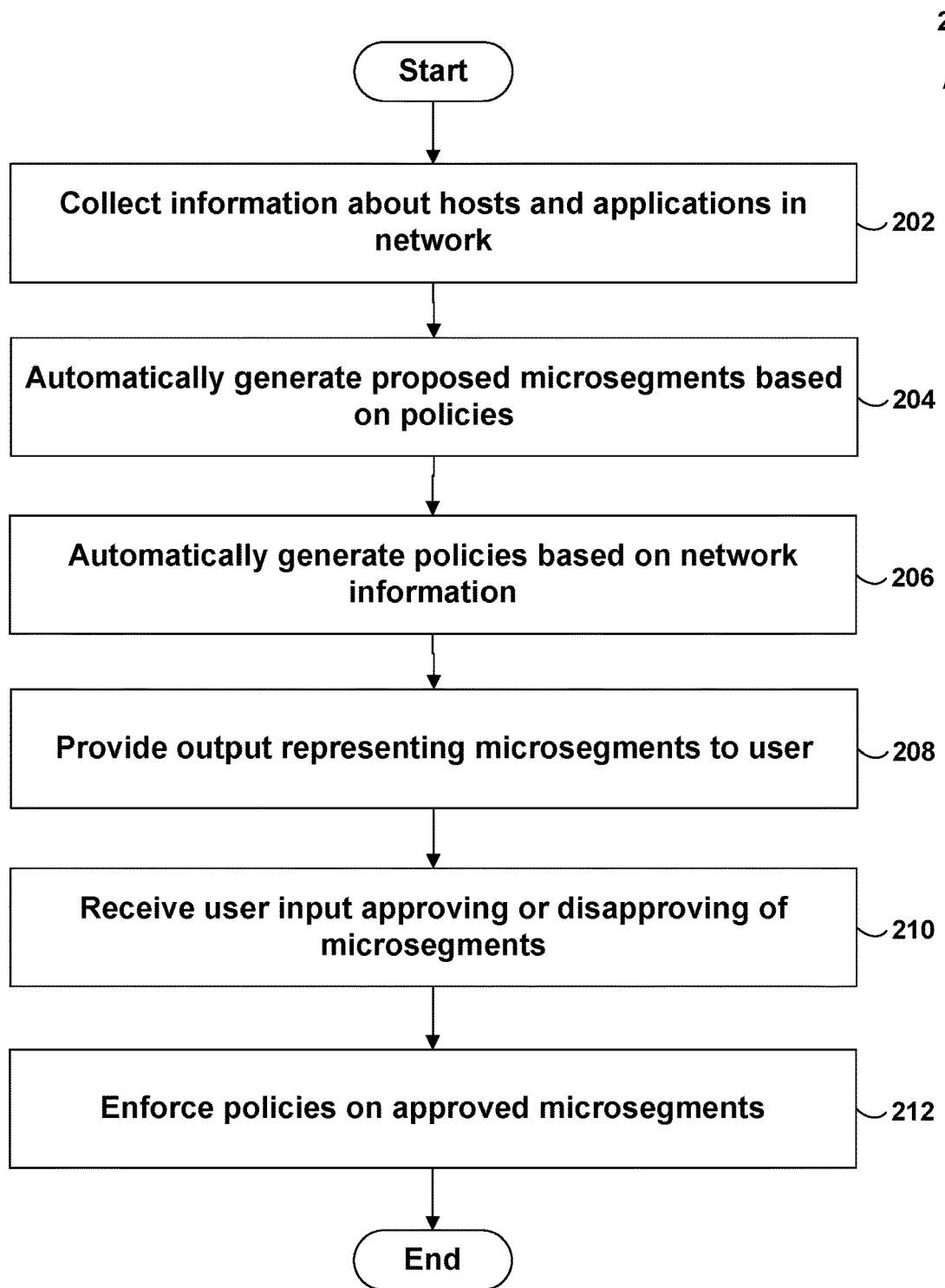
FIG. 2 is a flowchart of a method performed by the system of FIG. 1 according to one embodiment of the present invention.

Referring to FIG. 1, a dataflow diagram is shown of a system 100 for automatically proposing network microsegments and for receiving human approval of those proposed microsegments according to one embodiment of the present invention. Referring to FIG. 2, a flowchart is shown of a method 200 performed by the system 100 of FIG. 1 according to one embodiment of the present invention.

The system 100 includes a network 102. The network 102 may, for example, be implemented in any of the ways disclosed in the Policy Enforcement Patent and/or the Policy Generation Patent. For example, the network 102 may contain one or more hosts, also referred to herein as "systems." A system may, for example, be a computer of any kind and may, therefore, include at least one processor and at least one memory. The network 102 may also contain components for collecting network information, which are shown collectively in FIG. 1 as a network information collection module 104, and which are described in more detail in the Policy Enforcement Patent. The network information collection module 104 may collect network information 106 from the network 102, such as by using any of the techniques disclosed in the Policy Enforcement Patent (FIG. 2, operation 202). This is an example of what is referred to above as surveying the network 102 to find its functional components and their interrelations.

The system 100 also includes a microsegment generation module 108, which receives the network information 106 as input, and which automatically generates a set of proposed microsegments 110 as output (FIG. 2, operation 204). Examples of techniques that may be used by the microsegment generation module 108 to generate the proposed microsegments 110 are disclosed in the Policy Generation Patent. The proposed microsegments 110 may have any of the characteristics of microsegments disclosed herein.

The system 100 also includes a policy generation module 112, which receives the network information 106 as input, and which automatically generates a set of policies 114 as output based on the flow matches in the network information 106 (FIG. 2, operation 204). The polices 114 are examples of policies that control access to the proposed microsegments 110. For example, a first subset of the policies 114 may control access to a first one of the proposed microsegments 110, while a second, different, subset of the policies 114 may control access to a second one of the proposed microsegments 110. Flows, flow matches, and examples of techniques that may be used by the policy generation module 112 to generate the policies 114 are disclosed in the Policy Generation Patent.

The system 100 also includes a microsegment approval module 118, which receives the proposed microsegments 110 and associated policies 114 as input, and which generates, based on the proposed microsegments 110 and policies 114, output 120 to a human user 122 representing some or all of the proposed microsegments 114 and/or policies 114, such as by listing one or more of: (1) names and/or IP addresses of the hosts in each of the proposed microsegments 110; and (2) descriptions of the policies 114, such as flow matches (e.g., source and destination hosts and applications) in the policies 114 (FIG. 2, operation 208).

The system 100 also includes a user input module 126, which receives input 124 from the user 122 indicating whether the user 122 approves of each of the proposed microsegments 110 (FIG. 2, operation 210). Such input 124 may, for example, be binary for each of the microsegments 110, such as an input indicating "approve" or "disapprove." The input 124 may consist of a single gesture, such as a single click or tap (e.g., on an "approve" or "OK" button). The user 122 may provide separate input for each of one or more of the proposed microsegments 110, or may provide a single input that applies to some or all of the proposed microsegments 110. For example, the user may provide a single "approve" input that applies to all of the proposed microsegments 110.

The system 100 also includes a policy enforcement module 130, which enforces the policies (from among the policies 114) that define and protect the microsegment(s) that have been approved by the user 122, in response to receiving the user's approval of those microsegment(s) (FIG. 2, operation 212). The policy enforcement module 130 receives output 128, which indicates which microsegment(s), if any, the user 122 has approved. If the user 122 input indicates that the user 122 has not approved of any of the microsegment(s) 110, then the policy enforcement module 130 does not enforce any of the policies that control access to any of the proposed microsegments 110.

One embodiment of the present invention is directed to a method for use with a telecommunications network (such as the network 102). The telecommunications network includes a plurality of hosts. Each of the hosts may execute one or more instances of one or more applications. The method includes: (1) identifying a first functional component in the telecommunication network, wherein the first functional component comprises a first subset of the plurality of hosts, wherein hosts in the first subset satisfy a similarity criterion, such as by using the techniques disclosed above in connection with the network information collection module 104, the network information 106, the microsegment generation module 108, and the proposed microsegments of FIG. 1, and operations 202 and 204 of FIG. 2. The first subset of the plurality of hosts may, for example, be one of the proposed microsegments 110.

The method may also include: (2) identifying a first plurality of network application security policies that control access to the first subset of the plurality of hosts. Such network application security policies may be identified by, for example, generating those policies to control access to the first subset of the plurality of hosts (e.g., as described in generation with the policy generation module 112 and the policies 114 of FIG. 1 and operation 206 of FIG. 2), or by identifying existing policies that control access to the first subset of the plurality of hosts.

The method may also include: (3) providing first output, representing the first subset of the plurality of hosts, to a user, such as by using the techniques disclosed above in connection with the microsegment approval module 118 and proposed microsegment output 120 of FIG. 1 and operation 208 of FIG. 2.

The method may also include: (4) receiving first input, from the user, indicating approval of the first subset of the plurality of hosts, such as by using the techniques disclosed above in connection with the user input 124, the user input module 126, and the approval output 128 of FIG. 1 and operation 210 of FIG. 2. As described above, the user input 124 indicate approval or disapproval of the first subset of the plurality of hosts.

The method may also include: (5) in response to receiving the first input, applying the first plurality of network application security policies to the first subset of the plurality of hosts, such as by using the techniques disclosed above in connection with the approval output 128 and policy enforcement module 130 of FIG. 1 and operation 212 of FIG. 2.

The method may perform similar operations in connection with additional proposed microsegments, and the user may approve of one microsegment and disapprove of another microsegment. For example, the first user input may indicate approval of the first subset of the plurality of hosts, and the method may further include: (6) identifying a second functional component in the telecommunication network, wherein the second functional component comprises a second subset of the plurality of hosts, wherein hosts in the second subset satisfy a similarity criterion; (7) identifying a second plurality of network application security policies that control access to second subset of the plurality of hosts; (8) providing second output, representing the second subset of the plurality of hosts, to a user; (9) receiving second input, from the user, indicating disapproval of the second subset of the plurality of hosts; and (10) in response to receiving the second input, not applying the second plurality of network application security policies to the second subset of the plurality of hosts.

The user input (e.g., the first input and/or the second input) that approves or disapproves of a microsegment may, for example, be a single gesture, such as a single keypress, click, or tap.

Identifying the first plurality of network application security policies may include: (A) identifying network application security policies that govern inbound connections to the first subset of the plurality of hosts, and/or (B) identifying network application security policies that govern outbound connections from the first subset of the plurality of hosts.

Providing the output representing the first subset of the plurality of hosts to the user may include providing output representing at least one name of at least one of the first subset of the plurality of hosts, and/or providing output representing at least one Internet Protocol (IP) address of at least one of the first subset of the plurality of hosts. The first output may be provided, for example, through a user interface or an Application Program Interface (API).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically collect information about communications between networked applications. Such collection can only be performed by computer systems and not by humans. Furthermore, embodiments of the present invention can generate a network communication model by collecting and processing very large volumes of data, such as billions of matches, which would be impossible for a human to perform. For at least these reasons, embodiments of the present invention are inherently directed to computer-implemented systems and methods. Furthermore, embodiments of the present invention are directed to a problem—namely, improving security of networked communications between computer applications—which is inherently rooted in computer and Internet technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method comprising steps of:
   receiving information related to hosts and applications operating in a network where the information was obtained based on a survey of the network;
   identifying a plurality of microsegments utilizing the information, each microsegment includes a set of hosts similar to one another;
   for each of the plurality of microsegments, identifying security policies that control access to hosts in each microsegment; and
   providing the plurality of microsegments and corresponding security policies for approval thereof.

2. The method of claim 1, wherein the steps include responsive to the approval, applying the plurality of microsegments and the corresponding security policies.

3. The method of claim 2, wherein the approval is on a per microsegment basis.

4. The method of claim 1, wherein the steps include periodically repeating the receiving and the identifying steps to any of update existing microsegments and create new microsegments.

5. The method of claim 1, wherein the set of hosts are similar to one another based on any of
   their communication with one another,
   communication with another set of hosts, and
   software installed thereon.

6. The method of claim 1, wherein the security policies include any of allowing or disallowing inbound connections and/or outbound connections.

7. The method of claim 6, wherein the security policies are applied on a per application basis on each host.

8. The method of claim 1, wherein the providing includes displaying an output including listing names and/or Internet Protocol addresses of the hosts in each of the plurality of microsegments.

9. A non-transitory computer-readable medium storing computer program instructions that are executed by at least one computer processor to perform steps of:
   receiving information related to hosts and applications operating in a network where the information was obtained based on a survey of the network;
   identifying a plurality of microsegments utilizing the information, each microsegment includes a set of hosts similar to one another;
   for each of the plurality of microsegments, identifying security policies that control access to hosts in each microsegment; and
   providing the plurality of microsegments and corresponding security policies for approval thereof.

10. The non-transitory computer-readable medium of claim 9, wherein the steps include
    responsive to the approval, applying the plurality of microsegments and the corresponding security policies.

11. The non-transitory computer-readable medium of claim 10, wherein the approval is on a per microsegment basis.

12. The non-transitory computer-readable medium of claim 9, wherein the steps include
    periodically repeating the receiving and the identifying steps to any of update existing microsegments and create new microsegments.

13. The non-transitory computer-readable medium of claim 9, wherein the set of hosts are similar to one another based on any of
    their communication with one another,
    communication with another set of hosts, and
    software installed thereon.

14. The non-transitory computer-readable medium of claim 9, wherein the security policies include any of allowing or disallowing inbound connections and/or outbound connections.

15. The non-transitory computer-readable medium of claim 14, wherein the security policies are applied on a per application basis on each host.

16. The non-transitory computer-readable medium of claim 9, wherein the providing includes displaying an output including listing names and/or Internet Protocol addresses of the hosts in each of the plurality of microsegments.

17. A system comprising at least one computer processor executing computer program instructions stored on at least one non-transitory computer-readable medium to perform steps of:
    receiving information related to hosts and applications operating in a network where the information was obtained based on a survey of the network;
    identifying a plurality of microsegments utilizing the information, each microsegment includes a set of hosts similar to one another;
    for each of the plurality of microsegments, identifying security policies that control access to hosts in each microsegment; and
    providing the plurality of microsegments and corresponding security policies for approval thereof.

18. The system of claim 17, wherein the steps include
    responsive to the approval, applying the plurality of microsegments and the corresponding security policies.

19. The system of claim 18, wherein the approval is on a per microsegment basis.

20. The system of claim 17, wherein the steps include periodically repeating the receiving and the identifying steps to any of update existing microsegments and create new microsegments.

* * * * *